United States Patent
Pecen

(10) Patent No.: US 8,639,231 B2
(45) Date of Patent: Jan. 28, 2014

(54) SYSTEM AND METHOD OF RESTRICTING ENDPOINT IDENTIFIERS IN A COMMUNICATION SYSTEM

(75) Inventor: Mark Pecen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 349 days.

(21) Appl. No.: 12/491,032

(22) Filed: Jun. 24, 2009

(65) Prior Publication Data
US 2010/0330968 A1 Dec. 30, 2010

(51) Int. Cl.
*H04M 3/00* (2006.01)
*H04W 4/00* (2009.01)
*H04B 1/38* (2006.01)

(52) U.S. Cl.
USPC ............ 455/418; 455/435.1; 455/558

(58) Field of Classification Search
USPC ............ 455/414.1, 405–408, 418–421, 425, 455/435.1–435.3, 550.1, 551, 552.1, 553.1, 455/556.1, 556.2, 557, 558, 404.1, 410, 455/411, 414.3, 432.1, 432.3, 456.3, 456.5, 455/186.1; 370/310.2, 328, 338, 351–356; 379/7–51, 161, 168, 184, 189; 726/1–36; 380/247–250
See application file for complete search history.

(56) References Cited

U.S. PATENT DOCUMENTS

| | | | |
|---|---|---|---|
| 6,263,214 B1 * | 7/2001 | Yazaki et al. | 455/558 |
| 6,445,914 B1 * | 9/2002 | Findikli et al. | 455/411 |
| 7,302,272 B2 * | 11/2007 | Ackley | 455/466 |
| 2004/0015573 A1 | 1/2004 | Yuki et al. | |
| 2005/0075092 A1 * | 4/2005 | Kim | 455/411 |
| 2005/0266885 A1 * | 12/2005 | Katayanagi | 455/558 |
| 2006/0035631 A1 * | 2/2006 | White et al. | 455/418 |
| 2007/0129057 A1 * | 6/2007 | Xu et al. | 455/410 |
| 2008/0161050 A1 * | 7/2008 | Shudark et al. | 455/558 |
| 2008/0167036 A1 * | 7/2008 | Bush et al. | 455/435.1 |
| 2009/0016274 A1 * | 1/2009 | Nylander et al. | 370/328 |

FOREIGN PATENT DOCUMENTS

| | | |
|---|---|---|
| CN | 1750694 A | 3/2006 |
| KR | 20060024983 A | 3/2006 |
| KR | 20060065092 A | 6/2006 |
| WO | 2004019638 A2 | 3/2004 |

OTHER PUBLICATIONS

PCT International Search Report; PCT Application No. PCT/US2009/053347; Jul. 21, 2010; 3 pgs.
PCT Written Opinion of the International Searching Authority; PCT Application No. PCT/US2009/053347; Jul. 21, 2010; 4 pgs.

(Continued)

*Primary Examiner* — San Htun
(74) *Attorney, Agent, or Firm* — Conley Rose, P.C.; J. Robert Brown, Jr.

(57) ABSTRACT

A method for providing a mobile network code associated with a network operations center to a mobile terminal. The method reading a first mobile network code from a removable data device installed in the mobile terminal. The method further comprises reading a second mobile network code from a fixed memory of the mobile terminal. The method further comprises comparing the first mobile network code with the second mobile network code. The method further comprises, responsive to determining that the first mobile network code does not match the second mobile network code, disabling at least one non-emergency function of the mobile terminal.

14 Claims, 7 Drawing Sheets

(56) References Cited

OTHER PUBLICATIONS

3GPP TS 23.060v8.3.0; 3rd Generation Partnership Project; Technical Specification Group Services and System Aspects; General Packet Radio Service (GPRS); Service Description; Stage 2; Release 8; Dec. 2008; 99 pgs. Part 1.

3GPP TS 23.060v8.3.0; 3rd Generation Partnership Project; Technical Specification Group Services and System Aspects; General Packet Radio Service (GPRS); Service Description; Stage 2; Release 8; Dec. 2008; 100 pgs. Part 2.

3GPP TS 23.060v8.3.0; 3rd Generation Partnership Project; Technical Specification Group Services and System Aspects; General Packet Radio Service (GPRS); Service Description; Stage 2; Release 8; Dec. 2008; 72 pgs. Part 3.

Chinese Office Action; Application No. 200910173476.4; Aug. 15, 2012; 11 pages.

Chinese Office Action; Application No. 200910173476.4; May 27, 2013; 13 pages.

* cited by examiner

SYSTEM AND METHOD OF RESTRICTING ENDPOINT IDENTIFIERS IN A COMMUNICATION SYSTEM

BACKGROUND

As used herein, the term "mobile terminal" might in some cases refer to mobile devices such as mobile telephones, personal digital assistants, handheld or laptop computers, and similar devices that have telecommunications capabilities. Such a mobile terminal might consist of a device and its associated removable memory module, such as, but not limited to, a Universal Integrated Circuit Card (UICC) that includes a Subscriber Identity Module (SIM) application, a Universal Subscriber Identity Module (USIM) application, or a Removable User Identity Module (R-UIM) application. Any such easily removable data storage component will hereinafter be referred to as a SIM card. Alternatively, a mobile terminal might consist of the device itself without such a module. In other cases, the term "mobile terminal" might refer to devices that have similar capabilities but that are not necessarily transportable, such as desktop computers, set-top boxes, or network appliances.

Calls made to and from mobile terminals are typically controlled by a network operations center (NOC). A NOC is a central location at which information about telecommunications activities for a large number of mobile terminals can be collected, monitored, and analyzed in order to ensure that proper operation of a telecommunications network is maintained. In some cases, in addition to performing these control functions, a NOC may include switching and routing equipment that allows calls to be routed through the NOC. A NOC typically covers a wide geographic area or a large population. For example, two NOCs might cover the United States, while one NOC might cover Canada and one might cover the United Kingdom.

A mobile terminal is typically associated with a single NOC throughout the lifetime of the mobile terminal. That is, a mobile terminal's calls will generally be controlled by the same NOC, even if the user of the mobile terminal travels to an area where another NOC is closer or other circumstances of the use of the mobile terminal change. For example, a mobile terminal might be set up to have its calls controlled by a NOC in the United States. If the user of that mobile terminal traveled to China and placed a call to another user in China, control of the call would pass through the NOC in the United States, even if one or more NOCs were present in China. In some such cases, the mobile terminal might use a Public Land Mobile Network (PLMN) of another operator on a roaming basis.

A mobile terminal might be the ultimate recipient of a call or message, while a NOC might be an intermediary recipient. The mobile terminal to which a message is sent and/or the NOC that controls the message is specified by an endpoint identifier. An endpoint identifier might be an internet protocol (IP) address, a port number, a Uniform Resource Locator (URL), a subscriber identity number, an email address, or some other identifier or combination of identifiers that designate the recipient of a message. The NOC that controls a mobile terminal's calls is specified by an endpoint identifier known as the access point name (APN) of the NOC. The APN of the NOC that controls the calls of a particular mobile terminal might be embedded in the read-only memory (ROM) of the mobile terminal during the manufacture of the mobile terminal. As used herein, the term "manufacture" refers to any assembly and preparation activities performed on a mobile terminal prior to the time the mobile terminal is shipped from the manufacturer. "After the time of manufacture" of the mobile device refers to activities that occur after completion of the assembly of the device by the manufacturer, such as after it has left the manufacturer's facility or factory, or has been shipped to or arrives at the network provider, distributor, point-of sale, or party other than the manufacturer, or is delivered to the customer or user.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A communication system typically comprises a set of network elements, each of which provide specific functionality in the facilitation of information transfer and processing. Such a system may include a variety of data interchange technologies and transmission protocols. Data may originate at one physical location and be transmitted to a destination over a variety of media, including wireless, fiber, wire-line and others. Data may be processed and routed along the way from its source to its ultimate destination.

Such a communication system may be described in terms of a heterogeneous network, comprising a) one or more fixed or mobile terminals capable of originating and receiving information, b) one or more fixed or wireless access points capable of interchanging information with the fixed or mobile data terminal, c) one or more network elements capable of routing the information from the data terminal to an intended destination for such information, which may be another data terminal, remote host computer or other network element and d) an application residing on a remote data terminal, host or other network element corresponding to a final or intermediate destination of the data transmitted from the originating fixed or mobile terminal.

Figure 1:
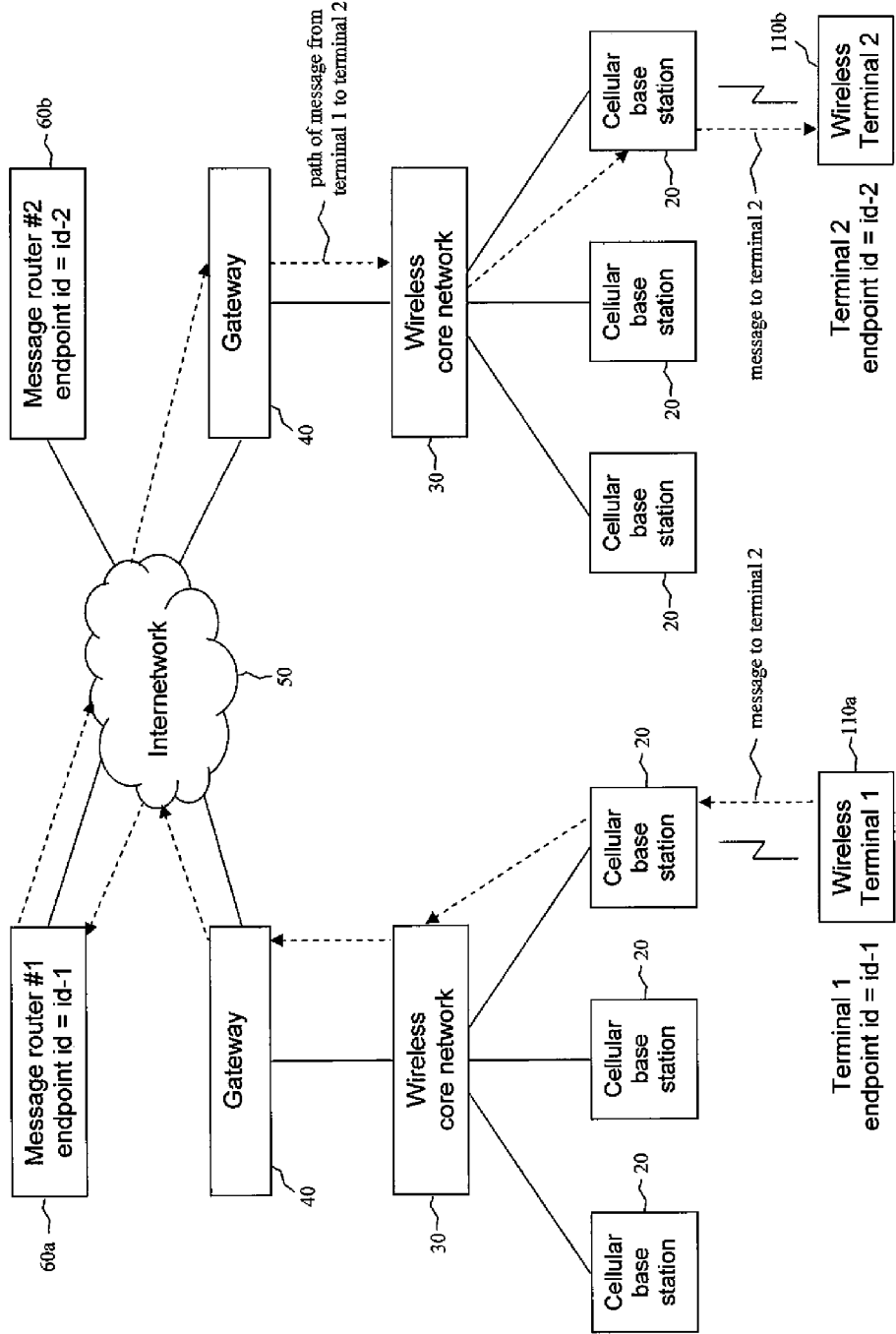
FIG. 1 is a diagram illustrating a communication system.

An example of such a communication system is shown in FIG. 1. In this example, the system comprises one or more wireless mobile terminals 110, one or more wireless base transceiver stations 20, one or more wireless core networks 30, one or more gateways 40 to the internetwork 50 or a private internet, one or more remote hosts 60 addressable on the internetwork 50, and one or more applications residing on the remote hosts 60 capable of processing information in such a way so as to route the information originating at one of the wireless remote wireless terminals 110 to another host or wireless terminal 110 for further routing or final consumption. In this scenario, a user of the wireless mobile terminal 110 may construct an electronic mail (email) message addressed to a specific recipient. This message is then transmitted to the wireless base transceiver station 20 and forwarded though the wireless core network 30. The wireless core network 30 sends the message through a gateway 40 through the internetwork 50 to the address of a host computer 60. The host computer 60 contains an application, which receives the message and routes it to another user residing on a different host computer 60 accessible via the internetwork 50, where a user of the host computer 60 receiving the message may read and/or store it. There are many other similar scenarios where information, messages or commands may be sent, routed and received over a wireless and/or wired network.

Figure 2:
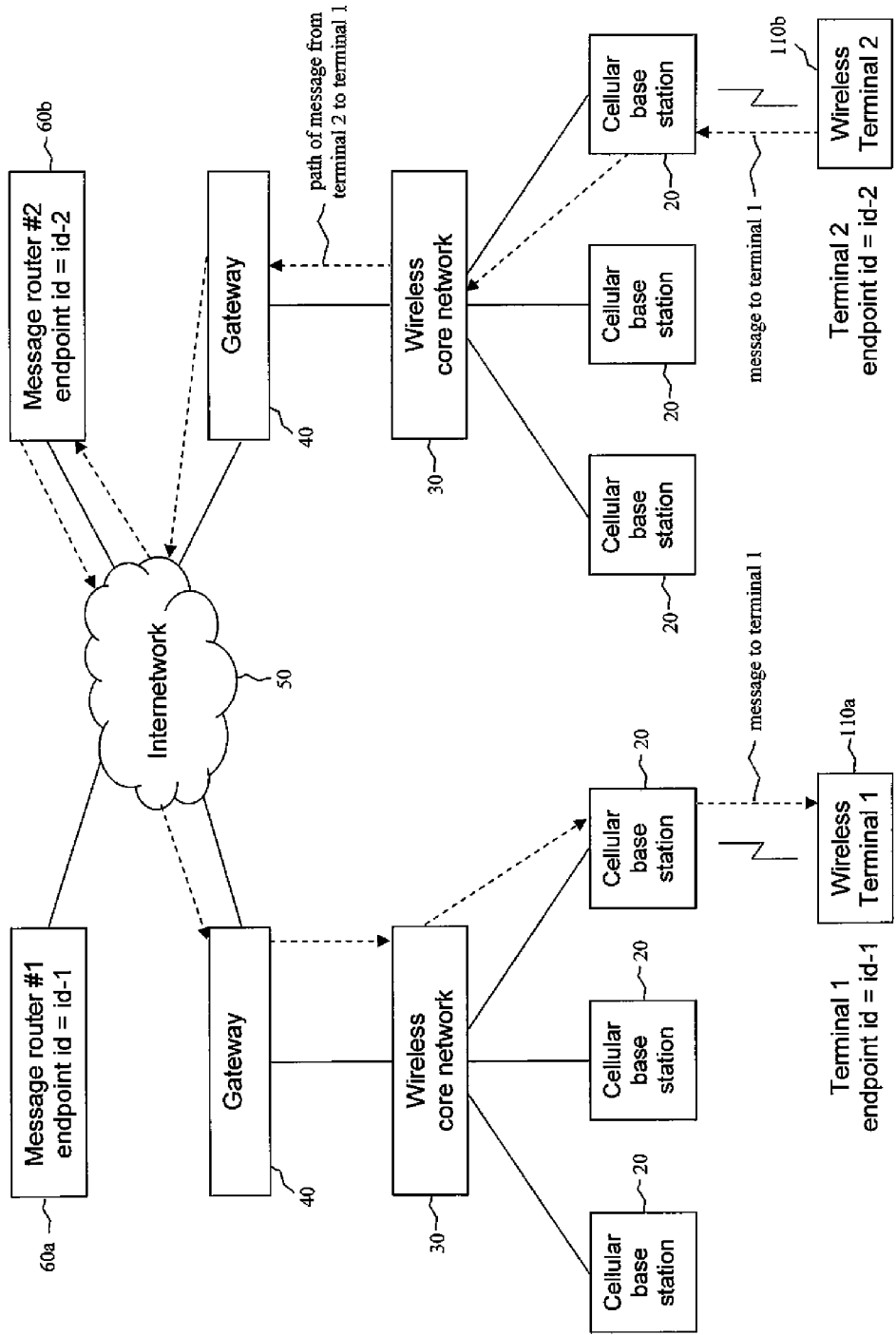
FIG. 2 is a diagram illustrating an alternative communication system.

In FIG. 1, all messages from Wireless Terminal #1 $110_a$ are routed through Message Router #1 $60_a$. For example, a message from Wireless Terminal #1 $110_a$, which has an endpoint identifier of id-1, is routed through the network 50 via Message Router #1 $60_a$ to Wireless Terminal #2 $110_b$. FIG. 2 is similar to FIG. 1 except that, in this case, Wireless Terminal #2 $110_b$ sends a message to Wireless Terminal #1 $110_a$, but the message is routed only through Message Router #2 $60_b$, which is specified as the endpoint contained in Wireless Terminal #2 $110_b$.

In an embodiment, an endpoint identifier of a NOC that controls the calls of a mobile terminal is provided to the mobile terminal from a source external to the mobile terminal after the time of the manufacture of the mobile terminal. The endpoint identifier is then written into the fixed memory of the mobile terminal. As used herein, the term "fixed memory" refers to memory that is installed and configured on the mobile terminal during the manufacture of the mobile terminal and that cannot easily by removed by a user of the mobile terminal. For example, fixed memory might be ROM or a similar type of memory that can be written to only once but can be read from many times. Fixed memory can be contrasted with a non-fixed memory device, such as a SIM card, that can easily be installed and removed by the mobile terminal user.

In some cases, the external source that provides the endpoint identifier to the mobile terminal is a SIM card or a similar non-fixed memory device, and the endpoint identifier of the NOC is written to the mobile terminal's fixed memory when the SIM card is installed in the mobile terminal and power is applied to the mobile terminal. In other cases, the external source is a network element, and the endpoint identifier of the NOC is transferred from the network element to the mobile terminal and then written to the mobile terminal's fixed memory. The installation of the SIM card or the transfer from the network element might be performed by a provider or operator of a telecommunications service.

Figure 3:
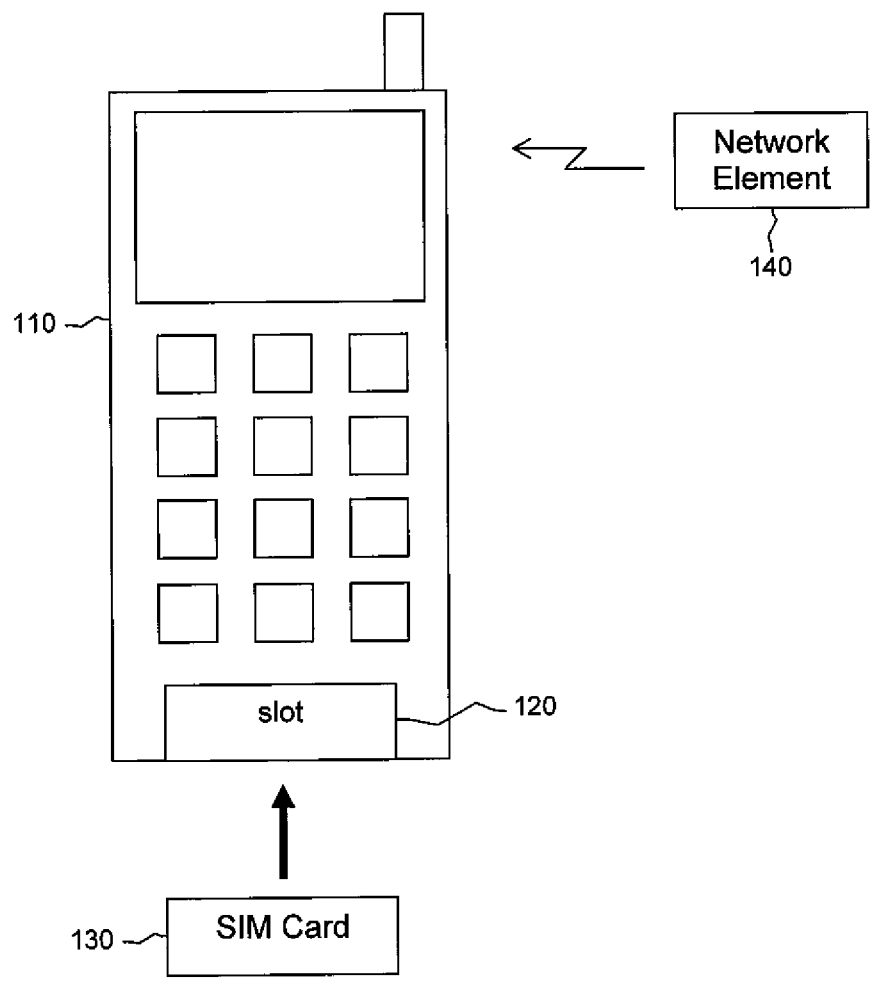
FIG. 3 is a diagram illustrating a mobile terminal and associated SIM card, according to an embodiment of the disclosure.

These embodiments are illustrated in FIG. 3, where a mobile terminal 110 is shown with a slot 120 or other receptacle into which a SIM card 130 can be inserted. The mobile terminal 110 might use any known or future communication technology, such as Global System for Mobile communications (GSM), Universal Mobile Telecommunications System (UMTS), WiFi, WiMax, Code Division Multiple Access 2000 (CDMA2000), or Long-Term Evolution (LTE). The SIM card 130 might be configured by a telecommunications service provider or operator to include the APN of a NOC or some other endpoint identifier of a NOC.

The first time the mobile terminal 110 is powered up with the SIM card 130 inserted into the slot 120, the NOC APN that is stored on the SIM card 130 is written from the SIM card 130 into the fixed memory of the mobile terminal 110. Due to the nature and configuration of the fixed memory, the writing of the NOC APN to the fixed memory needs to occur only once and the NOC APN can then be read from the fixed memory as many times as necessary. The service provider might install the SIM card 130 into the mobile terminal 110 and power up the mobile terminal 110 prior to the sale of the mobile terminal 110, possibly at the point of sale.

Alternatively, a NOC APN might be stored on a network element 140, such as a server or a data repository, and might be transferred from the network element 140 to the mobile terminal 110. The transfer might occur wirelessly, such as via a radio transmission, via a cable such as a USB cable, or via a coupling of the mobile terminal 110 and the network element 140 without an intervening cable. The NOC APN could then be written into the fixed memory of the mobile terminal 110. In some cases, the NOC APN might also be written to the SIM card 130.

The mobile terminal 110 includes the appropriate capabilities to receive the NOC APN from the SIM card 130 and/or the network element 140, write the NOC APN into its fixed memory, and perform other validation and initialization procedures as described below.

As mentioned previously, a service provider might configure a SIM card to include the APN of a NOC. Alternatively, when a mobile terminal receives an NOC APN from a network element, the mobile terminal might write the NOC APN to the mobile terminal's SIM card. In either case, the NOC APN stored in the mobile terminal's fixed memory should be the same as the NOC APN stored on the SIM card.

In an embodiment, a check can be done each time the mobile terminal is powered on, or at some other interval, to ensure that the NOC APN on the SIM card matches the NOC APN stored in the mobile terminal. A mismatch between the APNs on the SIM card and on the mobile terminal can indicate that the SIM card currently inserted in the mobile terminal is not the SIM card that was originally inserted in the mobile terminal. If the service provider wishes to discourage swapping of SIM cards, the service provider could disable one or more non-emergency functions or operations of the mobile terminal when such a mismatch is detected.

In various embodiments, the mobile terminal can perform one or more additional validation or initialization procedures. A check can be done each time the mobile terminal is powered on, or at some other interval, to determine whether a SIM card is present in the mobile terminal. If a SIM card is not present, one or more non-emergency operations of the mobile terminal might be disabled. Also, a check can be done each time the mobile terminal is powered on, or at some other interval, to determine whether the mobile terminal has been initialized. That is, it can be determined whether an endpoint identifier has already been written to the mobile terminal. If an endpoint identifier has not yet been written, it can be written to the mobile terminal's fixed memory at that time. In addition, before the endpoint identifier is written into fixed memory, a check can be made to ensure that the endpoint identifier is valid. The check might simply be a determination of whether the endpoint identifier is in the correct format, such as a hexadecimal number with a specified number of digits. If the endpoint identifier is found to be invalid, the endpoint identifier is not written to the mobile terminal's fixed memory.

In an embodiment, disabling a non-emergency function or operation could include comparing a dialed number for an attempted voice call with a predefined list of emergency numbers and, if the dialed number does not match any of the predefined emergency numbers, preventing connectivity of the attempted voice call. Alternatively, disabling a non-emergency function or operation could include determining whether an attempted outgoing communication is an emergency communication. If the attempted outgoing communication is an emergency communication, the outgoing communication is permitted, and if the attempted outgoing communication is not an emergency communication, the outgoing communication is prevented. The determination of whether an attempted outgoing communication is an emergency communication is not necessarily done by looking numbers up on a predefined list. For example, this determination could be made by pressing a certain key on a keypad or by selecting a menu item in a graphical user interface. That is, the user asserts that a call is an emergency call, and there is no need to address the trustworthiness of the user in the application.

Alternatively, disabling a non-emergency function or operation could include preventing one or more of the transmission of a data message, the reception of a data message, the operation of a video function (such as a camera), the operation of an audio function (such as an alarm), and the operation of a navigation function (such as a global positioning system). Alternatively, disabling a non-emergency function or operation could include comparing an identified recipient for a data message with a predefined list of emergency contacts and, if the identified recipient does not match any of the predefined emergency contacts, preventing transmission of the data message.

Figure 4:
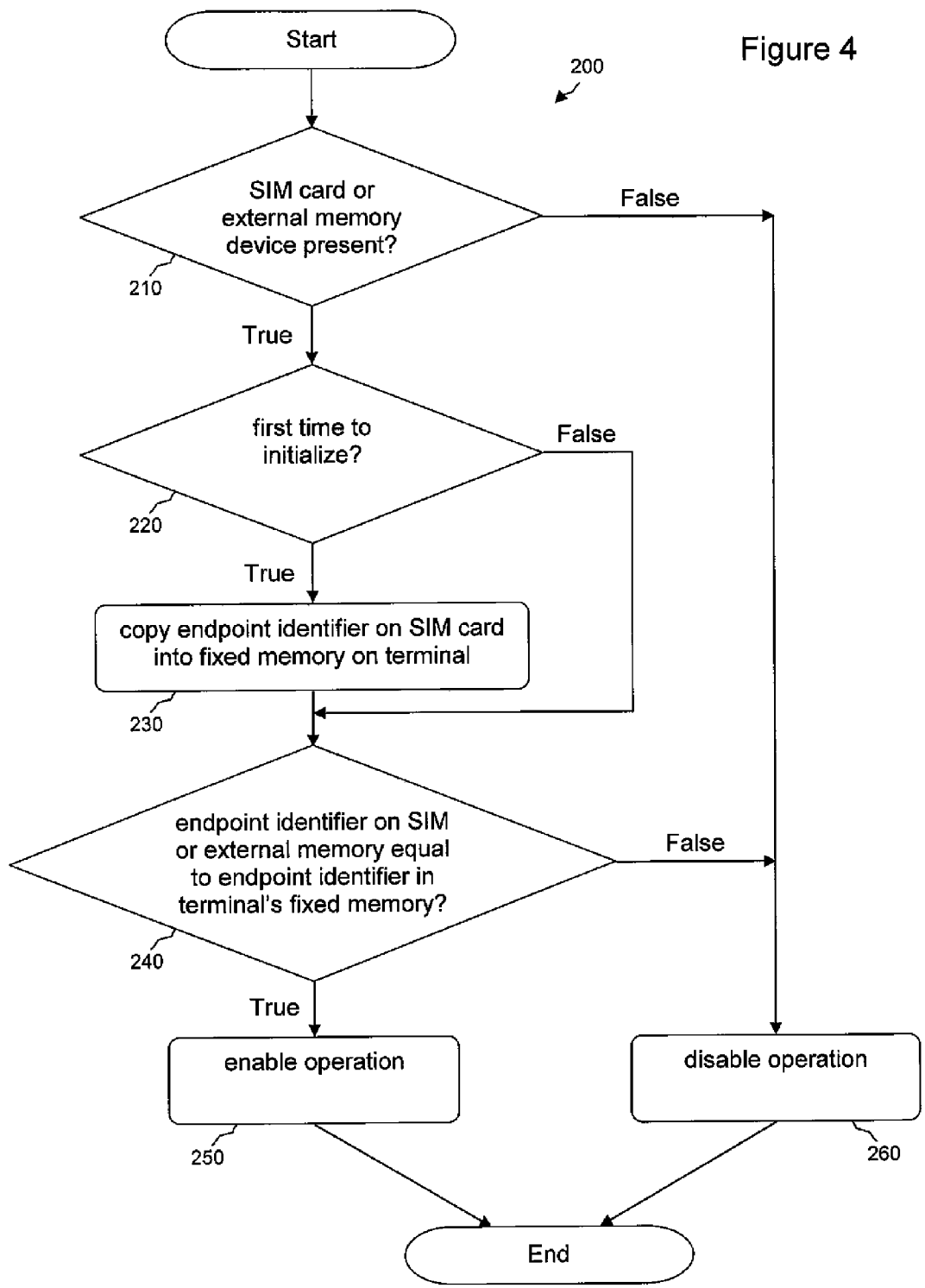
FIG. 4 is a block diagram of a method for providing an endpoint identifier of a NOC to a mobile terminal, according to an embodiment of the disclosure.

FIG. 4 illustrates an embodiment of a method 200 for enabling or disabling mobile terminal operations in this manner. In block 210, a determination is made whether a SIM card or a similar non-fixed memory device is present in the mobile terminal. If no SIM card is present, at least one non-emergency operation or function of the mobile terminal is disabled, as shown in block 260. For example, outgoing calls might be disallowed or the mobile terminal might be disabled completely. If a SIM card is present, the flow moves to block 220, where a determination is made whether this is the first time to initialize the mobile terminal. That is, it is determined whether or not an endpoint identifier has already been written to the mobile terminal's fixed memory. If this is the first time the mobile terminal has been initialized, the flow moves to block 230, where the endpoint identifier on the SIM card is copied from the SIM card into the fixed memory of the mobile terminal. The flow then moves to block 240. If, at block 220, it is determined that this is not the first time the mobile terminal has been initialized, the flow bypasses block 230 and moves to block 240.

In block 240, a determination is made whether the endpoint identifier on the SIM card is the same as the endpoint identifier in the mobile terminal's fixed memory. For example, a NOC APN on the SIM card could be compared to a NOC APN stored in the mobile terminal. If the endpoint identifiers do not match, the flow moves to block 260, where at least one non-emergency operation of the mobile terminal is disabled. If the endpoint identifiers do match, the flow moves to block 250, where all appropriate operations of the mobile terminal are enabled.

A service provider within a particular country might be identified by a mobile network code. That is, when a mobile network code and a mobile country code are assigned to a mobile terminal, the service provider that provides service for that mobile terminal is uniquely specified. A service provider may have several reasons for wishing to prevent a mobile terminal user from changing the mobile network code. For example, the service provider might subsidize a portion of the cost of the mobile terminal and sell the mobile terminal at a price lower than the price the user might typically pay. In exchange, the service provider might expect that the user will maintain an account with the service provider for a specified period of time. The service provider might ensure that the account is maintained by preventing any changes to the mobile network code on the subsidized mobile terminal. Tying a subsidized mobile terminal to a particular service provider can be referred to as a subsidy lock.

In an embodiment, the service provider's mobile network code might be written to mobile terminal from a SIM card or from a network element in a manner similar to that described above with regard to the NOC APN. Initialization and validation procedures similar to those described above with regard to the NOC APN might also be taken with respect to the mobile network code. That is, an initialization procedure can be performed in which it is determined whether a mobile network code has already been written to the mobile terminal's fixed memory. If a mobile network code has not yet been written, it can be written to the mobile terminal's fixed memory at that time. Also, the mobile terminal might perform a comparison between a mobile network code stored in its fixed memory and the mobile network code received from the SIM card or the network element. A mismatch between the mobile network codes can be an indication that an attempt is being made to use the mobile terminal with a service provider other than the service provider that originally set up the mobile terminal. In such a case, one or more non-emergency functions of the mobile terminal might be disabled. In this way, a subsidy lock can be created for the mobile terminal, and the mobile terminal might be enabled for use only in association with an account with the service provider that configured the SIM card.

When a subsidy lock based on a mobile network code is used in this manner, the validation and initialization procedures depicted in FIG. 4 might be modified appropriately to include an initialization procedure for the mobile network code and a comparison between the mobile network code stored in the mobile terminal and the mobile network code received from the SIM card or the network element. That is, additional steps might be added to the flowchart of FIG. 2 to include the mobile network code validation and initialization procedures.

Figure 5:
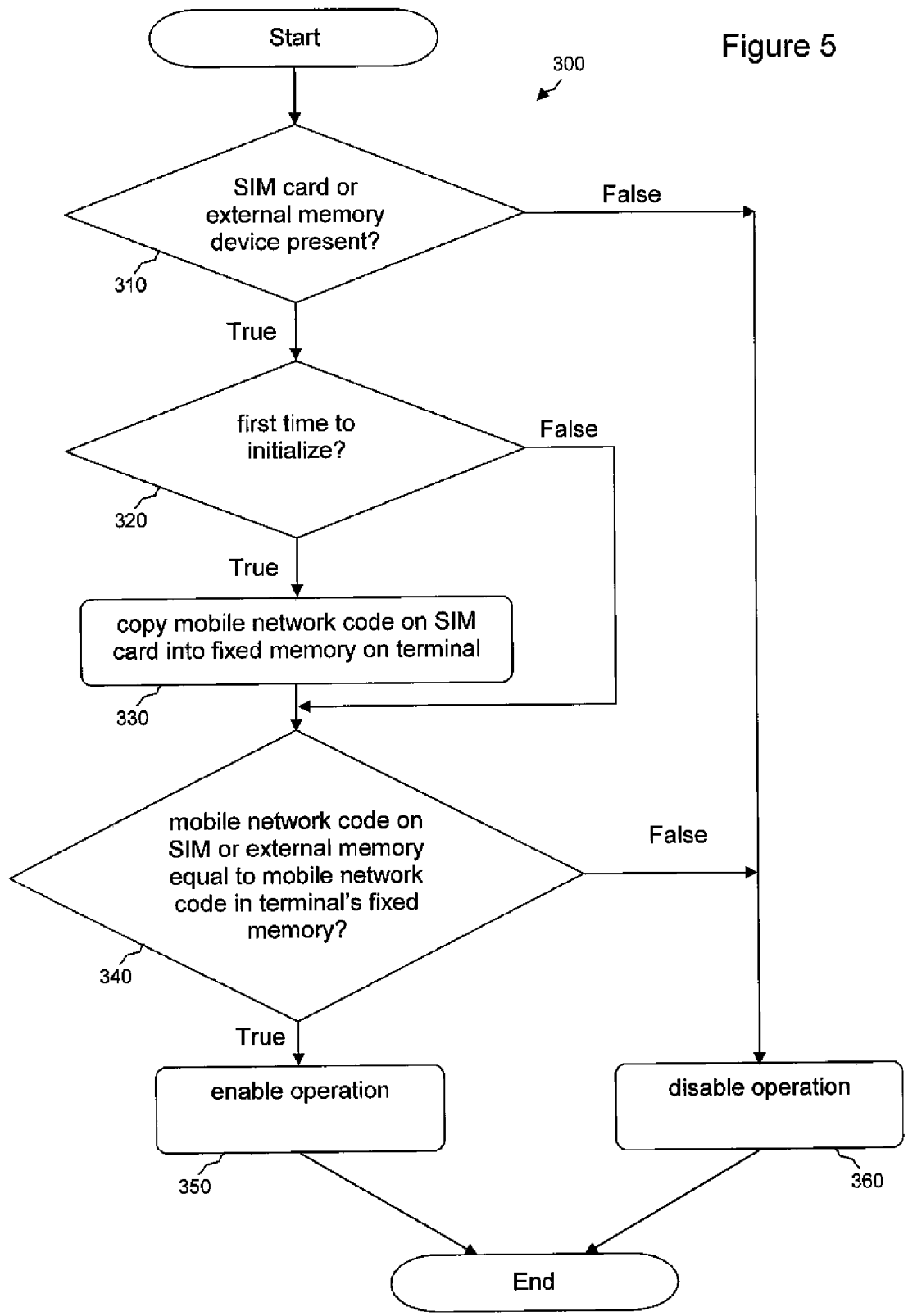
FIG. 5 is a block diagram of a method for providing a mobile network code to a mobile terminal, according to an embodiment of the disclosure.

Alternatively, validation and initialization procedures for the mobile network code might be performed in a separate flow of logic. This alternative is depicted in the method 300 of FIG. 5. In block 310, a determination might be made whether a SIM card is present in the mobile terminal. If no SIM card is present, at least one non-emergency operation of the mobile terminal is disabled, as shown in block 360. Alternatively, this step might not be included in the method 300 if a similar determination is made when the logic flow of FIG. 4 is executed. In block 320, a determination is made whether this is the first time to initialize the mobile terminal. If this is the first time the mobile terminal has been initialized, the flow moves to block 330, where the mobile network code on the SIM card is copied into the fixed memory of the mobile terminal. The flow then moves to block 340. If, at block 320, it is determined that this is not the first time the mobile terminal has been initialized, the flow bypasses block 330 and moves to block 340.

In block 340, a determination is made whether the mobile network code on the SIM card is the same as the mobile network code in the mobile terminal's fixed memory. If the mobile network codes do not match, the flow moves to block 360, where at least one non-emergency operation of the mobile terminal is disabled. If the mobile network codes do match, the flow moves to block 350, where all appropriate operations of the mobile terminal are enabled.

Specifying the NOC APN as described in the present embodiments could discourage the reselling of a mobile terminal in a country other than that in which it was originally sold. Since calls made by the mobile terminal would still be controlled by the NOC originally associated with the mobile terminal, delays could occur in calls made in locations far from the assigned NOC. Routing calls through a distant NOC could also increase the exposure to hacking of calls made by the resold mobile terminal. Such considerations might make reselling a mobile terminal on the "gray market" less desirable.

Also, the present embodiments can more easily provide control over the NOCs that control the calls made by a mobile terminal or a set of mobile terminals. This, in turn, can enhance the capability to perform global traffic planning. For example, some countries may prefer that their traffic not pass through certain other countries. By implementing the techniques described herein, the service providers in particular countries can more easily specify which NOCs will control the calls made by mobile terminals under that provider's control, and consequently under that country's control, and could thus specify which countries the calls will pass through.

In addition, the present embodiments can provide greater flexibility in assigning a NOC to a mobile terminal. Since the service provider is in control of which NOC APN is written to a mobile terminal and when the writing occurs, the service provider can easily choose the NOC that will control the calls made by the mobile terminals to which it provides service. This might allow the service provider to more easily balance its traffic loads among a plurality of NOCs.

The mobile terminal manufacturer would also be given more flexibility, since the manufacturer would not need to write a NOC APN to each mobile terminal it produces and then ship the mobile terminals to locations that are appropriate for the assigned NOC APNs. Instead, the manufacturer could omit the step of writing the NOC APN, thus making the mobile terminals available for shipment to any location without regard to the NOC APN that is most appropriate for the destination of the shipment. The service provider could then write an appropriate NOC APN to the mobile terminals.

Figure 6:
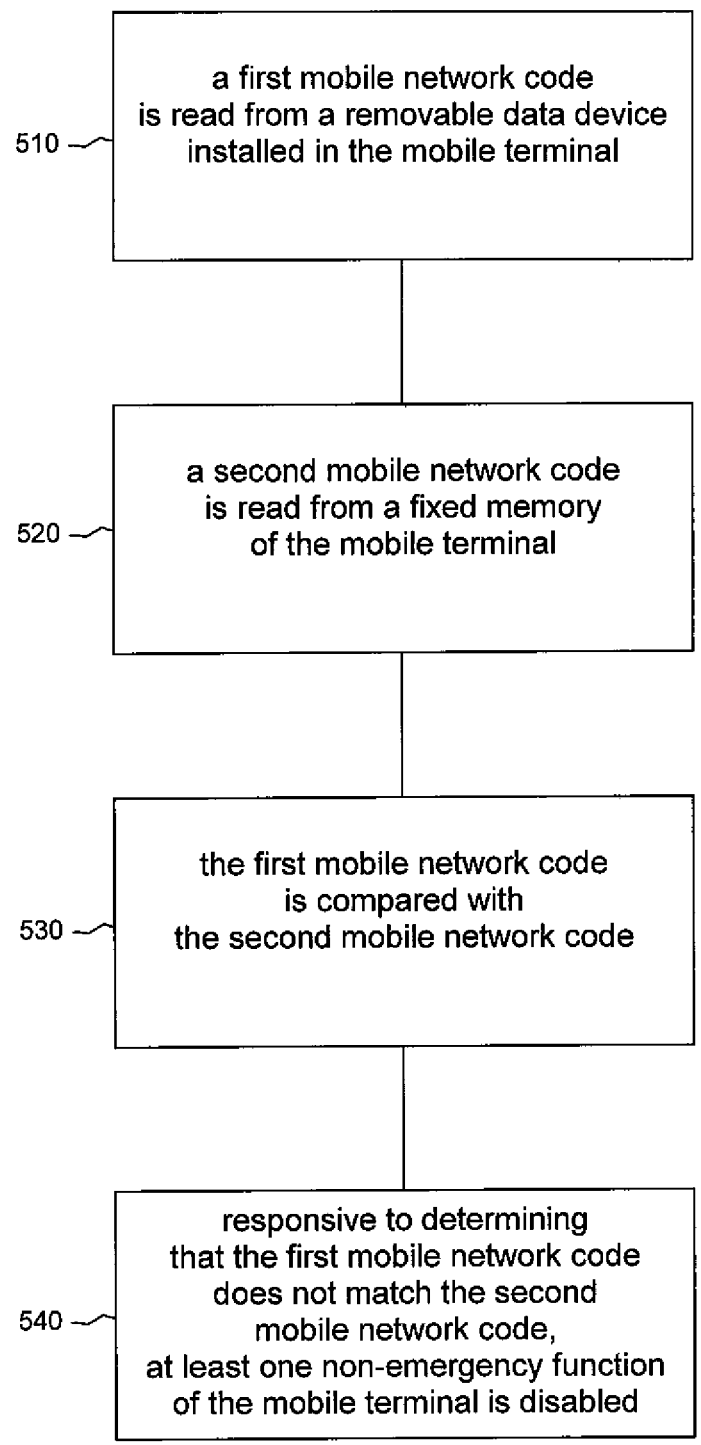
FIG. 6 is a block diagram of a method for providing a mobile network code associated with a network operations center to a mobile terminal, according to an embodiment of the disclosure.

FIG. 6 illustrates an embodiment of a method for providing an endpoint identifier associated with a network operations center to a mobile terminal. In block 510, a first mobile network code is read from a removable data device installed in the mobile terminal. In block 520, a second mobile network code is read from a fixed memory of the mobile terminal. In block 530, the first mobile network code is compared with the second mobile network code. In block 540, responsive to determining that the first mobile network code does not match the second mobile network code, at least one non-emergency function of the mobile terminal is disabled.

From another perspective, the present embodiments can be viewed as a system comprising a plurality of logics, where a logic might be hardware, firmware, software executing on a processor and associated circuitry, or some other entity capable of executing logical instructions. The system might include a first logic configured to read a first mobile network code from a removable data device installed in the mobile terminal; a fixed memory, configured to allow a write-once operation; a second logic, coupled to the fixed memory, configured to read a second mobile network code from the fixed memory; a third logic, coupled to the first logic and second logic, configured to compare the first mobile network code with the second mobile network code, responsive to determining that the fixed memory contains the second mobile network code; and a fourth logic, coupled to the third logic, configured to disable at least one non-emergency function of the mobile terminal, responsive to determining that the first mobile network code does not match the second mobile network code.

The system might also include a fifth logic, coupled to the first logic, the second logic, and the fixed memory, configured to write the first mobile network code to the fixed memory as the second mobile network code, responsive to determining that the fixed memory does not contain the second mobile network code. The second logic might be configured to determine whether the contents of the fixed memory of the mobile terminal comprise a valid mobile network code. The fourth logic might be further configured to compare a dialed number for an attempted voice call with a predefined list of emergency numbers. The system might also include an emergency call indicator control, which could be a special button or switch, a designated key on a keypad, or a graphical user interface selection.

Figure 7:
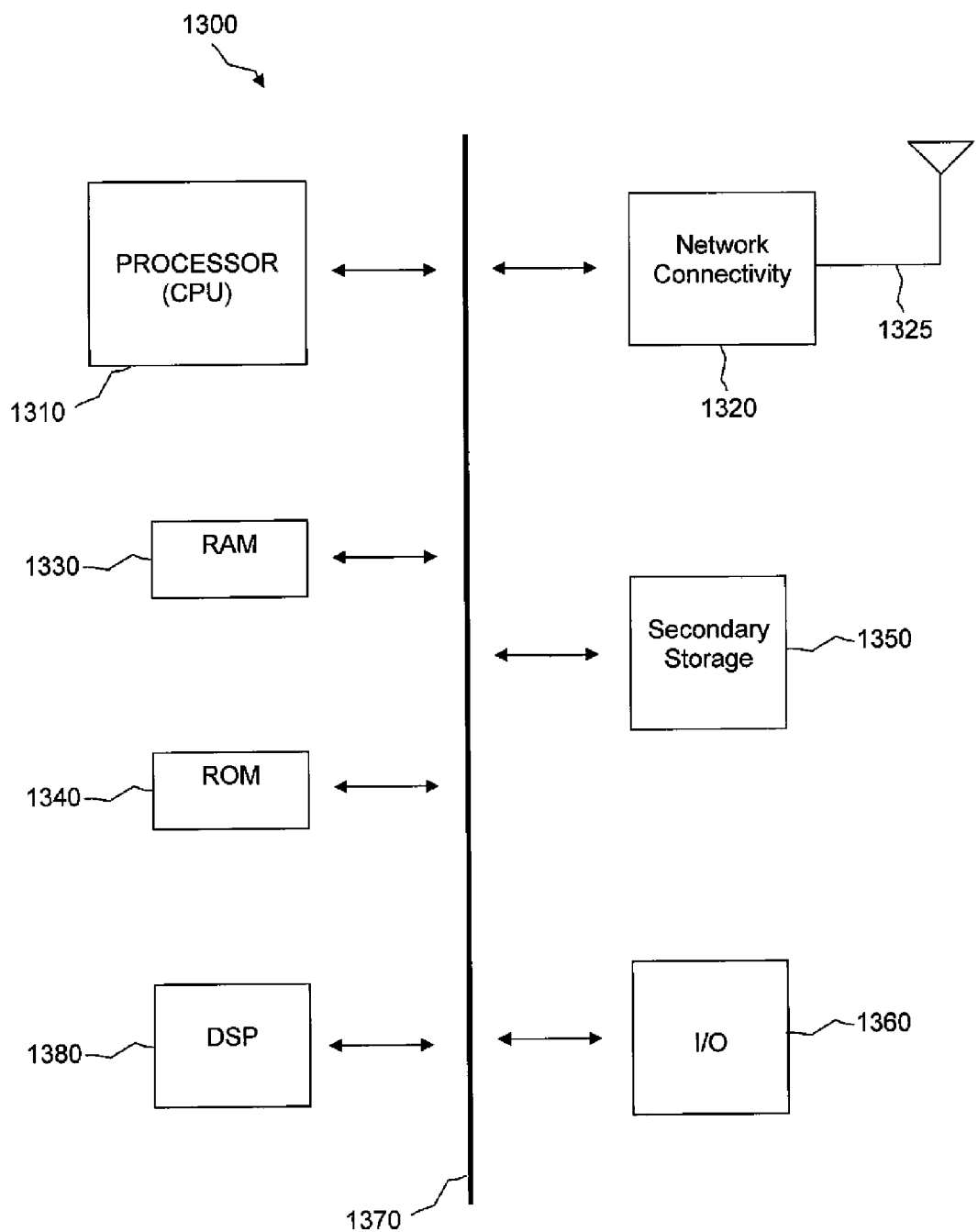
FIG. 7 illustrates a processor and related components suitable for implementing the several embodiments of the present disclosure.

The mobile terminal 110 described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for providing a mobile network code associated with a network operations center to a mobile terminal. The method comprises reading a first mobile network code from a removable data device installed in the mobile terminal. The method further comprises reading a second mobile network code from a fixed memory of the mobile terminal. The method further comprises comparing the first mobile network code with the second mobile network code. The method further comprises, responsive to determining that the first mobile network code does not match the second mobile network code, disabling at least one non-emergency function of the mobile terminal.

In another embodiment, a system for enforcing network routing is provided. The system includes a mobile terminal comprising a first logic configured to read a first mobile network code from a removable data device installed in the mobile terminal. The mobile terminal further comprises a fixed memory, configured to allow a write-once operation. The mobile terminal further comprises a second logic, coupled to the fixed memory, configured to read a second mobile network code from the fixed memory. The mobile terminal further comprises a third logic, coupled to the first logic and second logic, configured to compare the first mobile network code with the second mobile network code, responsive to determining that the fixed memory contains the second mobile network code. The mobile terminal further comprises a fourth logic, coupled to the third logic, configured to disable at least one non-emergency function of the mobile terminal, responsive to determining that the first mobile network code does not match the second mobile network code.

In another embodiment, an alternative system for enforcing network routing is provided. The system includes a mobile terminal comprising a first logic configured to read a first mobile network code from a removable data device installed in the mobile terminal. The mobile terminal further comprises a fixed memory, configured to allow a write-once operation. The mobile terminal further comprises a second logic, coupled to the fixed memory, configured to read a second mobile network code from the fixed memory. The mobile terminal further comprises a third logic, coupled to the first logic and second logic, configured to compare the first mobile network code with the second mobile network code, responsive to determining that the fixed memory contains the second mobile network code. The mobile terminal further comprises a fourth logic, coupled to the third logic, configured to prevent transmission of a data message, responsive to determining that the first mobile network code does not match the second mobile network code. The mobile terminal further comprises a fifth logic, coupled to the first logic, the second logic, and the fixed memory, configured to write the first mobile network code to the fixed memory as the second mobile network code, responsive to determining that the fixed memory does not contain the second mobile network code.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing a mobile network code which identifies a network operations center to a mobile terminal, the method comprising:
    reading a first mobile network code from a removable data device inserted in the mobile terminal;
    determining whether a fixed memory of the mobile terminal contains a second mobile network code; and
    responsive to determining that the fixed memory of the mobile terminal does not contain the second mobile network code, writing the first mobile network code into the fixed memory of the mobile terminal as the second mobile network code,
    wherein if the fixed memory does contain the second mobile network code and the first mobile network code does not match the second mobile network code, at least one non-emergency function of the mobile terminal, selected from a list comprising: transmission of a data message, reception of a data message, operation of a video function, operation of an audio function, and operation of a navigation function, is disabled, and wherein the first mobile network code and the second mobile network code are Access Point Name (APN) of a Network Operations Center (NOC) or some other endpoint identifier of the NOC.

2. The method of claim 1 further comprising:
rendering the fixed memory of the mobile terminal, containing the second mobile network code, read-only.

3. The method of claim 1 wherein determining whether the fixed memory of the mobile terminal contains the second mobile network code comprises determining whether contents of the fixed memory of the mobile terminal comprise a valid mobile network code.

4. The method of claim 1 further comprising:
determining whether the first mobile network code comprises a valid mobile network code.

5. The method of claim 1 wherein reading a mobile network code from a removable data device comprises reading a mobile network code from a subscriber identity module card.

6. The method of claim 1 wherein disabling at least one non-emergency function of the mobile terminal comprises:
comparing a dialed number for an attempted voice call with a predefined list of emergency numbers; and
responsive to the dialed number not matching any of the predefined emergency numbers, preventing connectivity of the attempted voice call.

7. The method of claim 1 wherein disabling at least one non-emergency function of the mobile terminal comprises:
comparing an identified recipient for a data message with a predefined list of emergency contacts; and
responsive to the identified recipient not matching any of the predefined emergency contacts, preventing transmission of the data message.

8. The method of claim 1 wherein the endpoint identifier is one or more of an internet protocol address, a port number, a uniform resource locator, and an email address.

9. A mobile terminal comprising:
a fixed memory, configured to allow a write-once operation; and
a processor, configured to:
read a first mobile network code from a removable data device inserted in the mobile terminal;
determine whether a fixed memory of the mobile terminal contains a second mobile network code; and
responsive to determining that the fixed memory of the mobile terminal does not contain the second mobile network code, write the first mobile network code into the fixed memory of the mobile terminal as the second mobile network code,
wherein if the fixed memory does contain the second mobile network code and the first mobile network code does not match the second mobile network code, at least one non-emergency function of the mobile terminal, selected from a list comprising: transmission of a data message, reception of a data message, operation of a video function, operation of an audio function, and operation of a navigation function, is disabled, and
wherein the first mobile network code and the second mobile network code are Access Point Name (APN) of a Network Operations Center (NOC) or some other endpoint identifier of the NOC.

10. The mobile terminal of claim 9, wherein the processor is configured to determine whether contents of the fixed memory of the mobile terminal comprise a valid mobile network code.

11. The mobile terminal of claim 9 wherein the removable data device comprises a subscriber identity module card.

12. The mobile terminal of claim 9 wherein the processor is further configured to compare a dialed number for an attempted voice call with a predefined list of emergency numbers.

13. The mobile terminal of claim 9 further comprising an emergency call indicator control.

14. The mobile terminal of claim 9 wherein the endpoint identifier is one or more of an internet protocol address, a port number, a uniform resource locator, and an email address.

* * * * *